United States Patent [19]
Canter, Jr. et al.

[11] Patent Number: 4,739,150
[45] Date of Patent: Apr. 19, 1988

[54] LEAD WELDING PROCESS

[76] Inventors: Clifton H. Canter, Jr., 246 Huntley Dr.; Christopher L. Canter, P.O. Box 1915, both of Lake Placid, Fla. 33852

[21] Appl. No.: 938,795

[22] Filed: Dec. 8, 1986

Related U.S. Application Data

[63] Continuation-in-part of Ser. No. 729,655, May 2, 1985.

[51] Int. Cl.⁴ ............................................. B23K 9/23
[52] U.S. Cl. .......................... 219/137 WM; 219/136
[58] Field of Search .......... 219/137 WM, 137 R, 136, 219/75

[56] References Cited

U.S. PATENT DOCUMENTS 3,873,803  3/1975  Young et al. ...................... 219/75 X
4,493,969  1/1985  Legrand et al. ................. 219/130.4

OTHER PUBLICATIONS

Griffing, Len, ed. *Welding Handbook*, 6 ed. Miami, Florida: American Welding Society, 1972, Chapter 71.
Cary, Howard B. *Modern Welding Technology*, Englewood Cliffs, New Jersey: Prentice-Hall, Inc., 1979, pp. 96–97, 458.

*Primary Examiner*—E. A. Goldberg
*Assistant Examiner*—Catherine M. Sigda
*Attorney, Agent, or Firm*—Charles J. Prescott; Raymond H. Quist

[57] ABSTRACT

Two lead members are juxtaposed on an electrically conductive surface forming a first electrode. A direct current electric arc is struck between a second electrode and at least one of the lead members. Inert gas is directed at the area being welded and the arc and work are moved relative to each other. The lead members are typically sheet members and the welds may be of the general types of welds formed with other metals. No metal is added in the welding process.

13 Claims, 3 Drawing Sheets

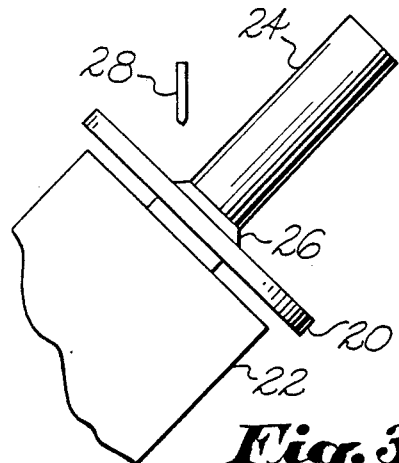
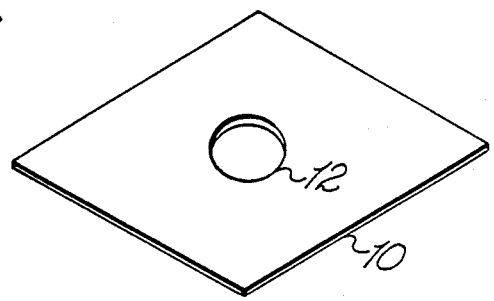
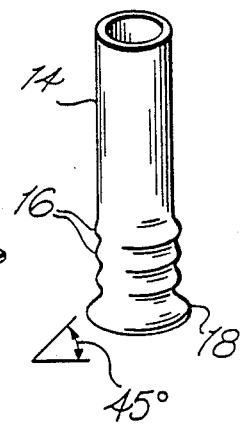
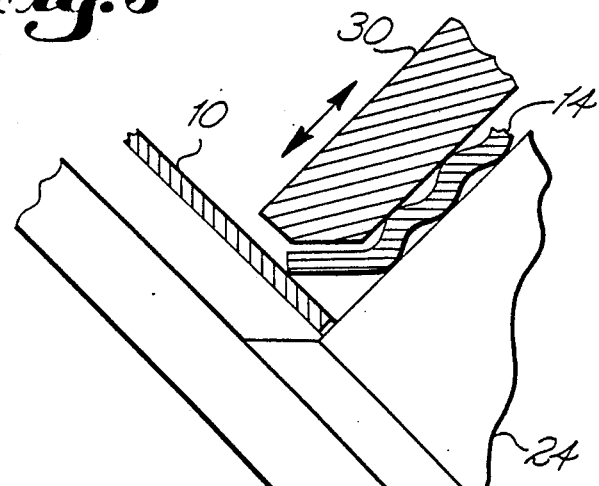
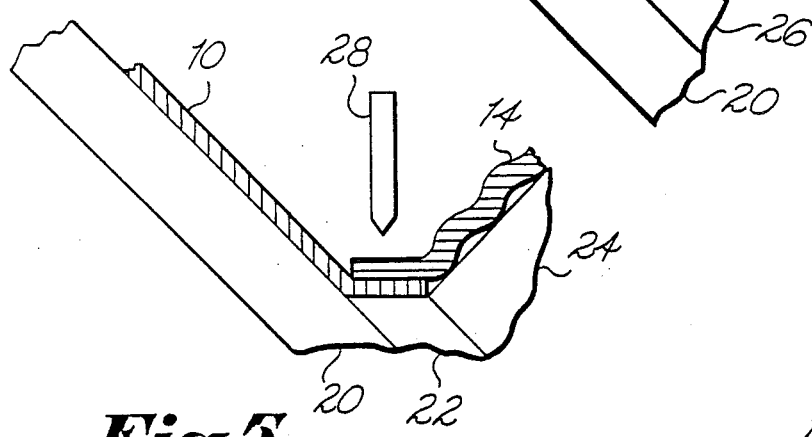
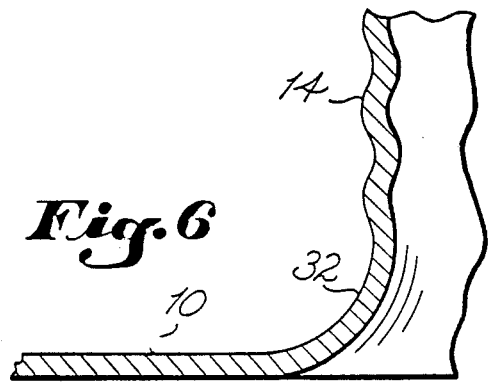

LEAD WELDING PROCESS

This invention is a continuation in part of application Ser. No. 06/729,655, filed 05/02/85.

BACKGROUND OF THE INVENTION

1. Field of the Invention

This invention relates generally to the welding of lead, and more particularly to a process for producing satisfactory lead welds by the use of an arc welding technique.

2. Description of the Prior Art

The joining of two lead members by a butt joint has traditionally been performed by applying heat at the location of the desired joint by using a oxygen-hydrogen torch. At the same time the heat is applied, additional metal from a hand held lead or solder bar is supplied at the joint. Because lead and lead alloys have a low melting temperature (327.4 degrees C. for lead), unskilled use of the torch may cause the lead to completely melt and run off leaving a hole instead of forming the desired joint. As a consequence, one or both of the members to be joined is damaged beyond repair and must be replaced.

It has been possible to join two lead members using the torch where heat can be applied by the torch to both members simultaneously. Thus a butt joint with both members in the same plane can be formed, or a joint with the two members at an angle with their edges adjacent to each other is commonly made. It is also possible, using a torch, to join the edge of one lead member to the surface of another lead member, making a T-shaped joint.

When an attempt is made to join two overlying lead members, however, and heat is applied to the upper member—the upper member will melt and run off before the bottom member becomes hot enough to fuse the two members together. Consequently it has not been possible to form seam joints between two lead members by using the oxygen-hydrogen torch. Also, it has not been possible to make satisfactory lap joints without the use of a filler bar.

A common product formed from lead is flashing which is used on roofs at locations where a pipe or the like passes through the roof. The purpose is to prevent rain water from running down the outside of the pipe and leaking into the building. Lead flashing is particularly useful because it is extremely pliable and can therefore be easily bent to fit over the top of the pipe and to conform to the roof line.

Lead flashing for a pipe is formed from a flat sheet with a circular hole punched from it which is joined to a cylinder. The joint between the flat sheet and the cylinder has been conventionally formed by placing the flat sheet (with the cylinder standing on it centered over the hole) on a horizontally oriented, rotating table. The operator uses the torch to melt a bar of lead or solder so that it forms a bead of supplementary metal completely around the cylinder at its juncture with the flat sheet. The operator controls the rate of rotation of the table by letting it rub against his hand and also holds the torch and the bar of lead or solder in the proper position. If the speed of rotation is too slow or the torch is held too close, a hole will result—ruining the product. If the operator permits the table to rotate too fast or keeps the torch too far from the juncture, fusion between the supplementary metal and the lead sheet and cylinder being joined will not occur.

Some fabrication errors can be corrected after they are discovered, but spoilage and excessive time of fabrication have made production of lead flashing for pipes costly, particularly with unskilled workers. An unskilled worker typically may produce 60 usable flashing products in one eight hour day using this existing technique. Approximately three months of experience are needed before an acceptable level of 500 products per day is achieved.

The low production rate and high spoilage make production by the conventional method expensive because of labor costs. The cost of the additional lead or solder used to make the bead is an added detrimental factor. There are other methods which are currently used, such as using a ring of solder which is positioned at the joint and then melted, and forming the bead on the bottom of the flat sheet, but these have the same objectionable features.

These problems associated with manufacturing lead articles make desirable a more reliable method of joining lead members.

It is therefore an object of this invention to provide a method of welding lead members which is less dependent upon skill than the use of a torch.

It is also an object of this inention to provide a lead welding process which is defined so that reproducible results are possible.

It is a further object of this invention to teach the forming of lap and seam joints by welding between lead members.

SUMMARY OF THE INVENTION

An electric arc shielded with an inert gas is used to produced butt, seam and lap welds between lead members. The applicability of these general teachings is used in forming lead flashing as follows. A lead sheet having a hole therein and a lead cylinder, both having the same thickness, are positioned on a rotatable table having a cylindrical mandrel extending therefrom. The cylinder is first given a flared edge at the end to be joined and a mating flared edge is produced on the lead sheet by forcing it against a conical form at the juncture of the table and the mandrel. A steel cylinder having a conical cutout at its bottom is pounded against the joint to make the flare, and to eliminate any air pockets between the surfaces to be joined. While the table is rotated, an electric arc is struck between an electrode and the joint. This arc is maintained while the joint turns through a complete revolution so that fusion occurs between the flared portion of the flat sheet and the flared portion of the cylinder around the entire joint. The table is positioned at an angle of 45 degrees with the horizontal and the flares are made at 45 degrees also. The joint is horizontal at the top which is where the arc is struck to prevent molten lead from running off.

BRIEF DESCRIPTION OF THE DRAWINGS

FIG. 1 shows a flat lead sheet used in making the lead flashing of this invention;

FIG. 2 shows a lead cylinder used in making the lead flashing of this invention;

FIG. 3 shows the apparatus used in making the lead flashing of this invention;

FIG. 4 is a fragmentary view of the apparatus in an intermediate step in the process;

FIG. 5 is a fragmentary view of the apparatus in a further step of the process;

FIG. 6 shows the lead flashing joint produced in the process of this invention;

DETAILED DESCRIPTION OF THE INVENTION

Figure 8:
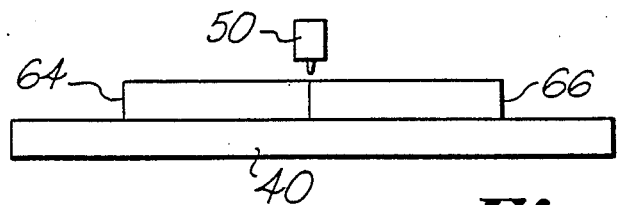
FIG. 8 shows a butt weld being formed.

FIG. 1 shows flat lead sheet 10 having circular hole 12 in the center thereof. Flat lead sheet 10 has a thickness which may be specified by a building code for lead flashing. Circular hole 12 is typically punched from flat lead sheet 10 in conventional fashion and has a diameter at least as large as the outside diameter of the pipe for which flashing is being fabricated.

FIG. 2 shows lead cylinder 14 which has a wall thickness the same as that of flat lead sheet 10 of FIG. 1. Cylinder 14 may be formed by extrusion or by bending a flat sheet around a cylindrical form and joining the edges using well known techniques. Cylinder 14 has corrugations 16 near its bottom end to facilitate its installation on a pipe passing through a pitched roof. In accordance with the invention, flare 18 has been formed at the bottom of cylinder 14. Flare 18 is preferably at an angle of 45 degrees although some variation from this angle would probably still permit fabrication of the flashing of this invention.

FIG. 3 illustrates table 20 which may be rotated by drive 22 upon activation of suitable switching means not shown. The speed of rotation of table 20 is varied in accordance with the size of the flashing to be fabricated, as will be discussed subsequently. Mounted at the center of table 20 is mandrel 24 and between the surface of table 20 and the surface of mandrel 24 is conical member 26. As shown, table 20 is mounted at an angle of 45 degrees with the horizontal and mandrel 24 is orthogonal to table 20, so that the portion of conical member 26 which is at the top is horizontal. Electrode 28 is positioned so as to be centerized with respect to conical member 26.

Turning next to FIG. 4, an enlarged fragmentary representation of table 20, mandrel 24 and conical member 26 is shown. Flat sheet 10 has been placed over mandrel 24 and is resting on conical member 26. Cylinder 14 has also been placed over mandrel 24 and is resting on flat sheet 10. Hammer 30, which is a heavy metal cylinder having a conical indentation at its lower edge, is then struck or pounded on the flared portion of cylinder 14 and forces it and the underlying flat sheet 10 against conical member 26 and table 20. This hammering step not only forms a flare on flat sheet 10 which will mate with the flare on cylinder 14, but also removes any air pockets which would cause defects in the joint to be made.

FIG. 5 again shows a fragmentary view of table 20, mandrel 24 and conical member 26, with flat sheet 10 and cylinder 14 after the hammering step of FIG. 4. Table 20 is rotated at a constant speed and welding is initiated. Welding is performed in the presence of an inert gas such as argon by striking an electric arc between electrode 28 and the overlapped portion of flat sheet 10 and cylinder 14. Electrode 28 is positioned before top dead center so that lead which becomes hot enough to flow will tend to be at the top point in the rotation of table 20 and will have recooled enough before passing top dead center so that it will not flow off. As opposed to the melting of the top layer only, which occurs when using a torch against overlapped lead layers, fusion of the two layers appears complete based on examination of the completed weld by sawing through it. This appearance is represented in FIG. 6. It will be noted that the resulting joint is of double the thickness of flat sheet 10 and cylinder 14. This is beneficial since the joint is most likely to be stressed in installation and handling. Recognition of this additional strength at the joint has resulted in an exception in a building specification in one case where the joint thickness was ruled to be equivalent to the required sheet thickness for flashing made in the conventional manner.

Not only is the resulting product superior, but an unskilled worker can produce 500 acceptable flashing units per day after a single day of training.

There remain variable factors in this process. The speed of rotation of table 20, the amperage applied by electrode 28, the thickness of the lead and the diameter of the cylinder can all change. In producing the lead flashing, table 20 was rotating at about 8 RPMs with the current set at a low setting of 45 to 55 amps. (The apparatus used will be identified below.) This current setting and rotational speed was varied by individual workers—some preferring to work at a higher rotational speed and higher current setting, and others preferring a lower speed and current.

Although production of lead flashing by welding has been satisfactorily performed as set forth above, a further investigation was performed to more precisely define the welding parameters.

Figure 7:
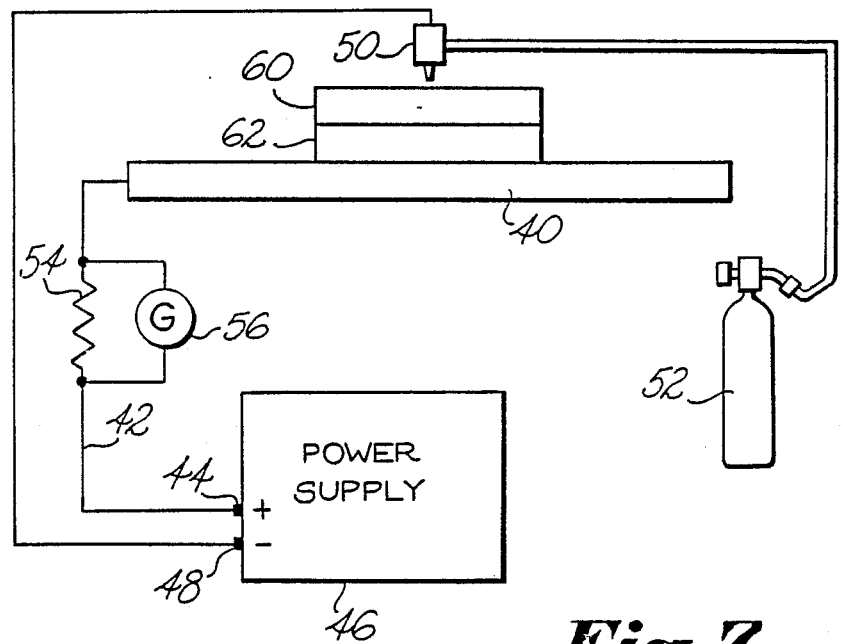
FIG. 7 shows a seam weld being formed together with the apparatus used to weld.

Referring to FIG. 7, table 40 is a ¼ inch steel plate which is connected by insulated 2/0 gauge braided copper cable 42 to positive terminal 44 of power supply 46. The power supply actually used was a Heliarc 250 HF, manufactured by the Linde Division of Union Carbide Corporation. Connected to negative terminal 48 of power supply 46 is torch 50. Torch 50 is a Heliarc HW-17 TIG Welding Torch also produced by Union Carbide. Torch 50 is fitted with a 3/32nd inch diameter tungsten electrode, and is supplied with an inert gas—in this case argon—from gas supply 52. In order to obtain an accurate measurement of the current consumed, an ammeter was connected in series with cable 42 in the form of shunt 54 and galvanometer 56.

Power supply 46 is provided with a high frequency selector switch having a "Continuous" position which was used in the welding to be described herein.

In the FIG. 7 embodiment, an upper member 60 and a lower member 62 are seam welded. The results of four trials are given below, all of which produced satisfactory welds.

| Sheet Thickness (in.) | Current (Amp) | Electrode Gap (in.) | Weld Width (in.) |
| --- | --- | --- | --- |
| 0.045 | 33.9 | 0.058 | 0.240 |
| 0.071 | 65 | 0.062 | 0.280 |
| 0.130 | 168 | 0.042 | 0.500 |
| 0.130 | 162 | 0.010 | 0.600 |

These welds were produced at a linear speed of 0.43 inches/second, with the Current Range Selector of the power supply set at a 35 ampere minimum.

In the FIG. 8 embodiment, a first member 64 and a second member 66 were butt welded on table 40. All of the trials listed below produced satisfactory results.

| Sheet Thickness (in.) | Current (Amp) | Electrode Gap (in.) | Weld Width (in.) |
| --- | --- | --- | --- |
| 0.042 | 23.4 | 0.080 | 0.260 |
| 0.042 | 22.5 | 0.030 | 0.240 |
| 0.069 | 36.4 | 0.080 | 0.290 |
| 0.071 | 37.7 | 0.010 | 0.270 |
| 0.130 | 70 | 0.010 | 0.400 |
| 0.129 | 69 | 0.060 | 0.340 |
| 0.237 | 168 | 0.080 | 0.760 |
| 0.237 | 168 | 0.060 | 0.800 |

The Current Range Selector of the power supply was set at a 5 ampere minimum for the sheets of 0.042 inch thickness, and at a minimum of 35 amperes for the others. The weld speed was 0.43 inches/second.

Figure 9:
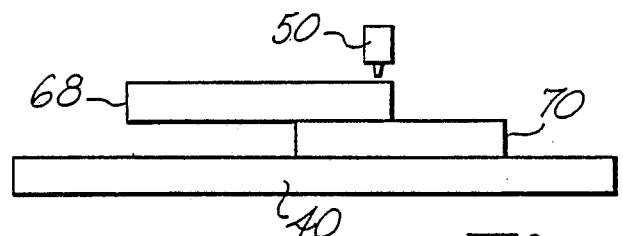
FIG. 9 shows a lap weld being formed.

In the FIG. 9 embodiment, a first member 68 and a second member 77 were lap welded on table 40. The results of three trials are given below, all of which produced satisfactory welds.

| Sheet Thickness (in.) | Current (Amp) | Electrode Gap (in.) | Weld Width (in.) |
| --- | --- | --- | --- |
| 0.045 | 33.4 | 0.042 | 0.320 |
| 0.045 | 33.9 | 0.105 | 0.420 |
| 0.071 | 65 | 0.080 | 0.460 |

These welds were produced at a speed of 0.43 inches/second. The Current Range Selector of the power supply was set at a 35 ampere minimum.

It should be noted that the lead used in the sheets which were welded is about 99.965 percent pure and is of the quality commercially used in industry for various products. The results obtained are therefore of general applicability The width of the welds was observable on both the top surface of the upper member and the bottom surface of the lower member for the seam and lap welds on the thinnest sheets.

The Heliarc 250 HF welding power supply which was used in the welding performed includes a switch identified as a High Frequency Selector Switch. This switch was kept in the "Continuous" position. In this position an alternating current is superimposed on the direct current and the solenoid which controls the delivery of the inert gas from gas supply 52 is actuated to the open position. This alternating current has a Gaussian distribution centered at approximately 1.1 megahertz. This current is so low compared to the welding current that it is not believed to have any appreciable effect on the welding, but it accompanies the desired delivery of inert gas.

The data tabulated above does not appear to show any consistent correlation between the electrode gap and any other parameter. The measured current increased in an almost direct relationship with the increase of the sheet thickness. The width of the welds also increased as the current and sheet thickness went up.

Figure 10:
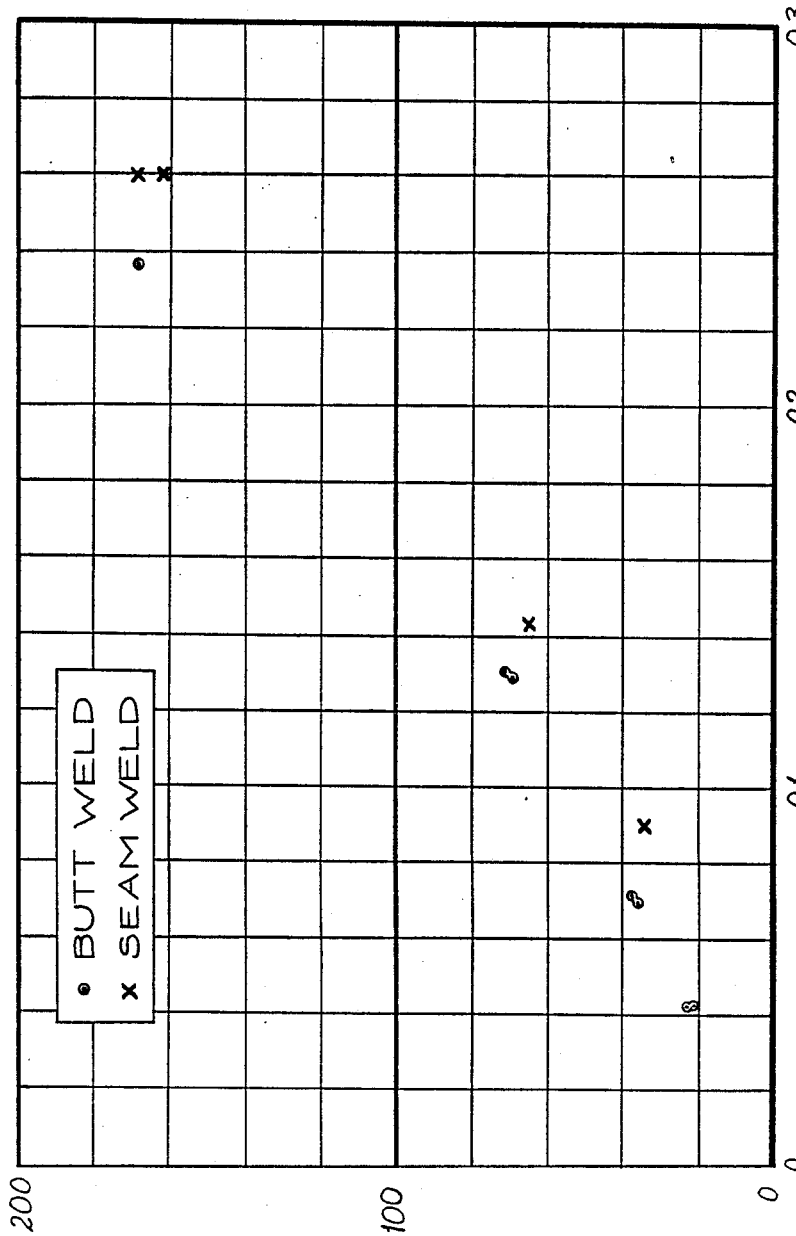
FIG. 10 is a graph of welding current versus lead thickness.

The relationship between current and sheet thickness has been found to be capable of extrapolation, within limits, so as to permit prediction of the current which will be required to satisfactorily weld sheets of any particular thickness. Referring to FIG. 10, the currents have been plotted as the ordinate and sheet thickness as the abscissa for both the butt and seam welds. In the case of the seam welds, the thickness as plotted is double the thickness of the sheets, since this is the thickness the current tranversed.

Figure 11A:
FIG. 11A is a cross-section showing two members arranged for a butt weld.
Figure 11B:
FIG. 11B is a cross-section showing the butt weld.
Figure 12A:
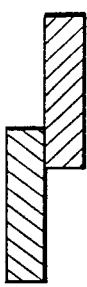
FIG. 12A is a cross-section showing two members arranged for a lap weld.
Figure 12B:
FIG. 12B is a cross-section showing the lap weld.
Figure 13A:
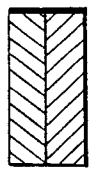
FIG. 13A is a cross-section showing two members arranged for a seam weld.
Figure 13B:
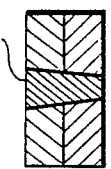
FIG. 13B is a cross-section showing the seam weld.

FIGS. 11A and 11B show cross-sections of lead members before and after butt welding. The portion 80 of FIG. 11B shows the configuration of the welded area. Similarly, FIGS. 12A and 12B show before and after cross-sections of a lap weld with welded area 82; and FIGS. 13A and 13B show before and after cross-sections of a seam weld with welded area 84.

It has been noted that welding as described herein differs from arc welding as normally performed on steel as no sacrificial electrode or auxiliary metal source is used. It also differs from traditional resistance welding because no pressure is applied. The description is therefore not made using those terms, but represents the process performed.

While the instant invention has been shown and described herein in what is conceived to be the most practical and preferred embodiment, it recognized that departures may be made therefrom within the scope of the invention, which is therefore not to be limited to the details disclosed herein, but is to be afforded the full scope of the claims so as to embrace any and all equivalent apparatus and articles.

We claim:

1. A process for producing a fused joint through first and second lead members having an overlapped portion comprising:
    positioning said first and second lead members with at least a portion of the first member overlapping a portion of the second; and
    striking a direct current arc of between 50 and 85 amperes per one tenth inch of member thickness between an electrode and said overlapped portions of the lead members and moving said arc and said overlapped portions relative to each other for the length of the joint overlapped portions relative to each other for the length of the joint to be formed in the presence of an inert gas.

2. A process in accordance with claim 1 further including the step of:
    pounding the overlapped lead members before striking said arc whereby air pockets will not be formed.

3. A process in accordance with claim 1 further including the step of:
    maintaining the portion of said joint having molten lead horizontal until said lead solidifies enough not to run off.

4. A process in accordance with claim 1 wherein:

one of said lead members is a flat sheet and the other of said lead members is a cylinder; and the overlapped portions of the two lead members are at an angle of 45 degrees to both of said members.

5. A process for joining lead members comprising:

placing said lead members in juxtaposition with a portion of each said member overlapping a portion of the other said members, with at least one of said members being in contact with an electrically conductive surface forming a first electrode;

striking a direct current electric arc of between 50 and 85 amperes per one tenth inch of member thickness between a second electrode and at least one of said juxtaposed members at a point in the overlapped portion where a weld is desired to form a weld substantially through said members; and moving said second electrode and the overlapped portion of said juxtaposed members relative to each other to extend the weld.

6. A process for joining lead members in accordance with claim 5 wherein:

said direct current arc has a superimposed alternating current.

7. A process for joining lead members in accordance with claim 6 wherein:

said first electrode is the positive electrode and said second electrode is the negative electrode.

8. A process for joining lead members in accordance with claim 5 wherein:

one of said lead members is lying on said electrically conductive surface and the other of said lead members has one edge overlying said one lead member.

9. A process for welding two lead (Pb) members with a lap joint comprising:

positioning said two lead members on an electrically conducting surface connected to a first terminal of a power supply with an edge of one of said members to be welded overlying the other of said members; power supply above said overlying edge of said one member;

striking a direct current arc of between 50 and 85 amperes per one tenth inch of member thickness between said electrode and the overlying edge of said one member to form a weld substantially through said two members; and moving said arc and said overlying edge of said one member relative to each other so that said arc moves along said overlying edge.

10. A process for welding two lead members with a lap joint in accordance with claim 9 wherein:

said first terminal is the positive terminal and said second terminal is the negative terminal.

11. A process for welding two lead (Pb) members along a desired seam comprising:

positioning one of said members on an electrically conducting surface connected to a first terminal of a power supply;

positioning the other of said members on top of said one member with the desired seam of said other of said members overlying the desired seam of said one member;

positioning an electrode connected to a second terminal of a power supply above the desired seam of said other of said members;

striking a direct current arc of between 50 and 85 amperes per one tenth inch of lead thickness between said electrode and said other of said members to form a weld substantially through said two lead members; and moving said arc and said desired seam of said other of said members relative to each other so that said arc moves along said seam.

12. A process for welding two lead members along a desired seam in accordance with claim 11 wherein:

said first terminal is the positive terminal and said second terminal is the negative terminal.

13. A process for joining lead (Pb) members comprising:

placing said lead members in juxtaposition with a portion of each said member overlapping a portion of the other said members, with at least one of said members being in contact with an electrically conductive surface forming a first electrode;

striking an electric arc between a second electrode and at least one of said juxtaposed members at a point in the overlapped portion where a weld substantially through said members is desired;

said electric arc being a direct current arc of between 50 and 85 amperes per one tenth inch of lead member thickness with a superimposed alternating current;

directing an inert gas upon the area where said arc is being applied; and moving said second electrode and said juxtaposed members relative to each other at a rate of from one quarter to three quarter inches per second to extend the weld.

* * * * *